Figure 1:
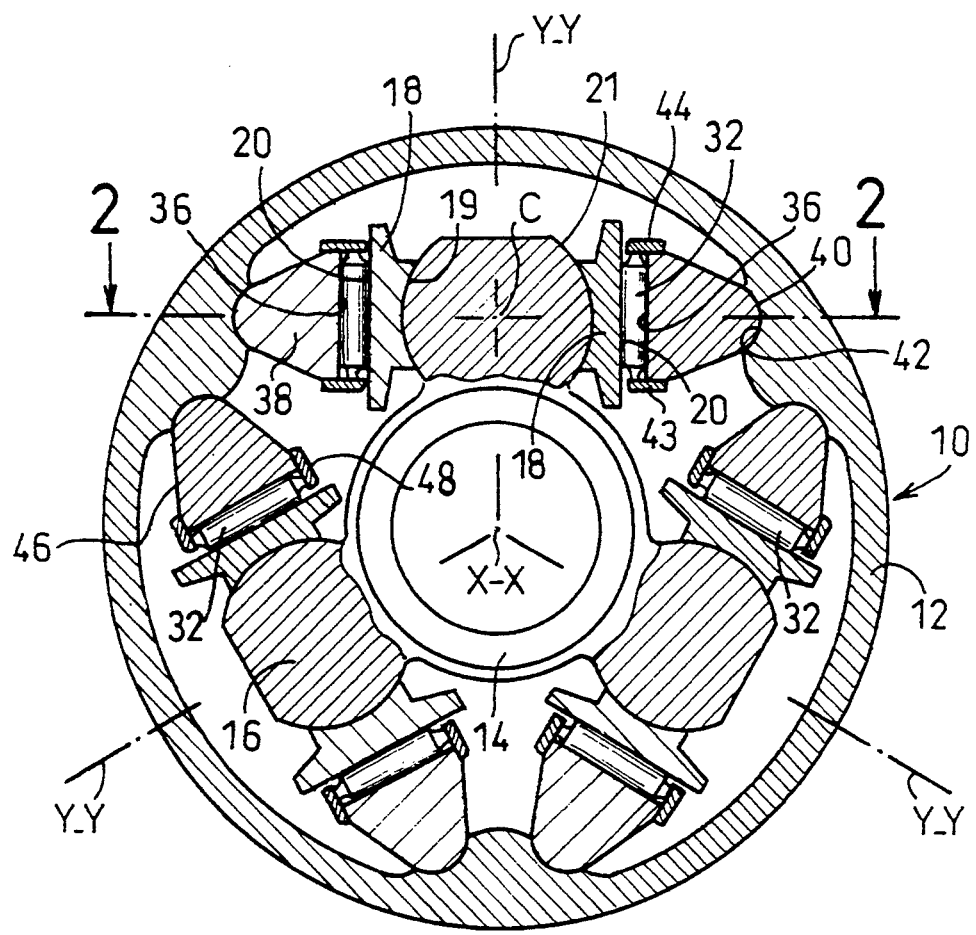

United States Patent [19]
Poulin

[11] Patent Number: 5,397,271
[45] Date of Patent: Mar. 14, 1995

[54] ARTICULATED TRANSMISSION JOINT OF THE SLIDABLE TYPE

[75] Inventor: Bernard Poulin, Conflans Ste Honorine, France

[73] Assignee: GKN Automotive AG, Germany

[21] Appl. No.: 97,277

[22] Filed: Jul. 23, 1993

[30] Foreign Application Priority Data

Jul. 24, 1992 [FR] France ................. 92 09181

[51] Int. Cl.⁶ .............................................. F16D 3/26
[52] U.S. Cl. .................................. 464/111; 464/167; 464/905
[58] Field of Search ............... 464/111, 120, 122, 123, 464/124, 132, 167, 905

[56] References Cited

U.S. PATENT DOCUMENTS

| | | | |
|---|---|---|---|
| 4,512,750 | 4/1985 | Orain | 464/111 |
| 4,741,723 | 5/1988 | Orain | 464/111 |
| 4,886,479 | 12/1989 | Richtmeyer et al. | 464/124 |
| 5,160,297 | 11/1992 | Uchman | 464/111 |
| 5,184,978 | 2/1993 | Fillmore et al. | 464/111 |
| 5,256,107 | 10/1993 | Matsumoto et al. | 464/123 |
| 5,330,389 | 7/1994 | Jost et al. | 464/111 |

FOREIGN PATENT DOCUMENTS

| | | |
|---|---|---|
| 491747 | 6/1919 | France . |
| 2506872 | 12/1982 | France . |
| 2554532 | 5/1985 | France . |
| 2567222 | 1/1986 | France . |
| 2655695 | 6/1991 | France . |
| 2199113 | 12/1986 | United Kingdom . |
| 2199638 | 7/1988 | United Kingdom . |

Primary Examiner—Lenard A. Footland
Assistant Examiner—Eileen A. Dunn
Attorney, Agent, or Firm—Harness, Dickey & Pierce

[57] ABSTRACT

Articulated transmission joint (10) of the slidable type comprising a transmission joint body (12) and a tripod element (14) having three radial arms (16) each of which arms is slidable between two planar surface portions (36) through the medium of two articulation elements (18) which are pivotally mounted on a spherical trunnion (21) of the tripod element (14), each articulation element (18) defining a planar surface (20) which is cooperative with one of the planar surface portions (36). The joint body (12) comprises three bearing ways each comprising two tracks (38) each of which tracks is constituted by a member defining a planar surface portion (36) and a convex cylindrical surface portion (40) which is cooperative with a complementary concave cylindrical bearing surface (42) formed in the joint body (12).

7 Claims, 2 Drawing Sheets

ARTICULATED TRANSMISSION JOINT OF THE SLIDABLE TYPE

The present invention relates to an articulated transmission joint of the slidable type, in particular for an automobile vehicle.

The invention more particularly relates to a homokinetic transmission joint of the type comprising a transmission joint body, also termed barrel, and a tripod element having three radial arms evenly spaced apart around the axis of the tripod element, each arm carrying an articulation element of the transmission joint which is cooperative with an associated bearing way formed in the transmission joint body.

The document FR-A-2,506,872 discloses a homokinetic joint of this type in which each radial arm of the tripod element is slidable between two opposed planar surface portions of the joint body through the medium of two opposed articulation elements which are pivotally mounted on a spherical trunnion formed on the arm of the tripod element, each one of which has a planar surface which is cooperative with one of said planar surface portions of the transmission joint body.

In order to filter the vibrations coming from the driving element and reduce periodical internal frictions in the joint, it has in particular been proposed to interpose a series of rolling elements between the intermediate articulation elements and the planar surface portions of the transmission joint body, said rolling elements being for example constituted by a row of rolling needles retained in a cage.

However, it has been found that the transmission joint body is difficult to produce in an economical manner in that it is necessary to form in the transmission joint body pairs of planar and parallel rolling tracks and faces or grooves for guiding and retaining the rolling needle cages.

It has also been found that there is a radial sliding phenomenon between the planar surface portions of the transmission joint body and the planar surfaces formed on the intermediate articulation elements, when the joint operates at an angle. This radial sliding phenomenon, i.e. occurring in a direction substantially parallel to the axis of a radial arm of the tripod element, is particularly harmful when the rolling elements are formed by a series of rolling needles.

Further, the loads resulting from the transmission of torque are not always centred relative to the rolling elements, which may have harmful consequences and produce in particular an overload on the ends of the needles.

In order to overcome these drawbacks, the invention provides a transmission joint of the aforementioned type, characterized in that the joint body comprises three bearing ways each comprising two tracks each of which tracks is constituted by a member defining a planar surface portion which is cooperative with the planar surface of the associated articulation element and further defining a convex cylindrical surface portion which has an axis parallel to said planar surface portion of said member and is cooperative with a complementary concave cylindrical bearing surface which is formed in the joint body and relative to which it is pivotable, and the axes of the two concave cylindrical bearing surfaces of the same bearing way are parallel to each other.

According to other features of the invention:

the axes of the six concave cylindrical bearing surfaces are parallel to one another;

a series of rolling elements retained in a cage is interposed between each planar surface of an articulation element and the planar surface portion formed on the associated track;

the rolling elements are needles;

each of the needle cages comprises at least one longitudinal guiding and retaining side wall which extends in a direction perpendicular to the axes of rotation of the needles and is cooperative with at least one complementary guide surface formed on the associated track and parallel to the axis of the convex surface portion of said track;

each cage comprises two parallel guiding and retaining side walls between which are received two parallel and opposed guide surfaces of the associated track, and each track is axially immobilized relative to the transmission joint body.

Figure 2:
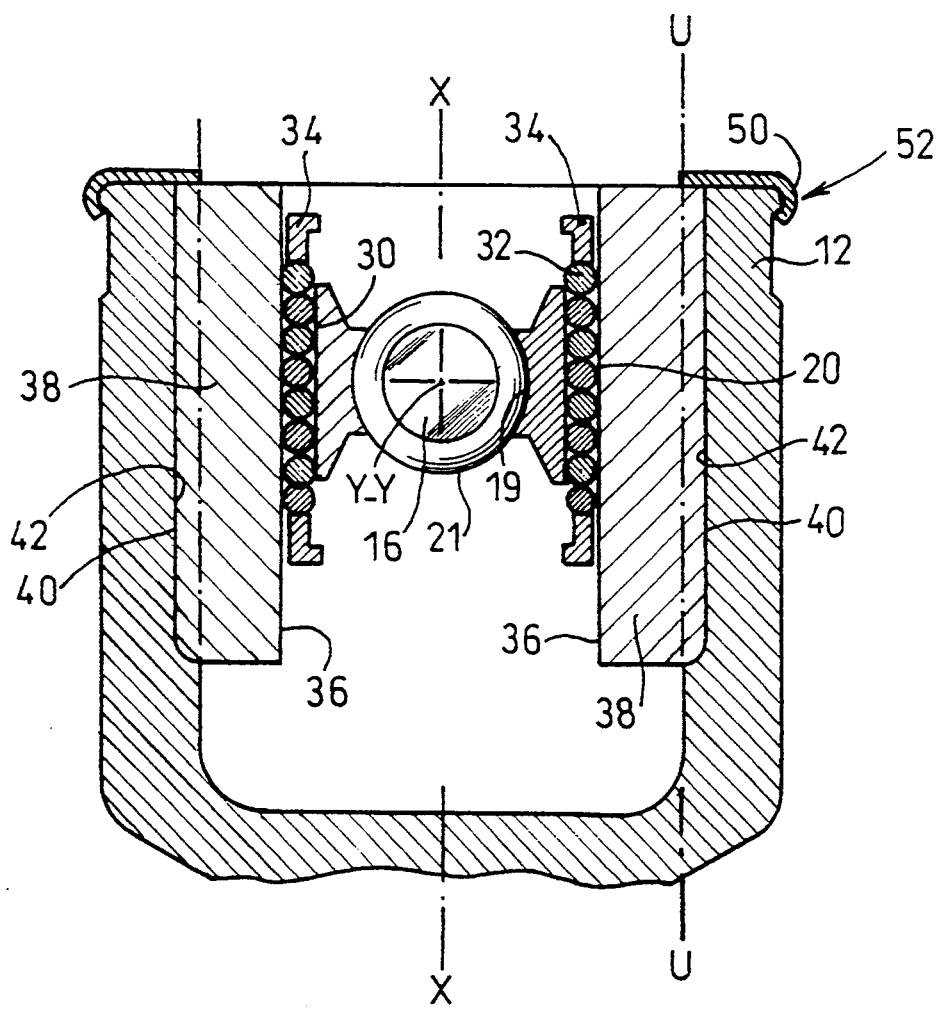

Further features and advantages of the invention will be apparent from the following detailed description with reference to the accompanying drawing in which:

FIG. 1 is a cross-sectional view in a plane containing the axes of the arms of the tripod element of a homokinetic transmission joint constructed in accordance with the teaching of the invention, and FIG. 2 is a sectional view taken on line 2—2 of FIG. 1.

The transmission joint 10 illustrated in FIGS. 1 and 2 comprises a transmission joint body 12, also termed a barrel, which may be for example connected to a driving element of an automobile vehicle transmission.

The transmission joint 10 further comprises a tripod element 14 having three radial arms 16 evenly spaced 120° apart about the axis of rotation X—X of the tripod element.

The tripod element 14 may for example be connected to a driven element of the transmission of the vehicle. Each of the arms 16 is constructed in the shape of a spherical trunnion the centre C of which is located on the axis Y—Y of the radial arm of the tripod element which is concurrent with and perpendicular to the axis of rotation X—X of the tripod element 14.

Each spherical trunnion 16 receives two intermediate articulation elements 18 which are pivotally mounted on the spherical trunnion 16.

For this purpose, each intermediate articulation element 18, also termed cup or bushing, has a concave spherical surface portion 19 which is complementary to a convex spherical surface portion 21 of the trunnion 16.

Each intermediate articulation cup 18 also has a planar surface 20.

Each of the two planar surfaces 20 is cooperative with a row of needles 32.

Each row of rolling needles 32 is retained in a cage 34.

The rolling needles 32 of each row are also cooperative with a planar surface portion 36 formed on a track 38.

Each track 38 is constructed in the form of an independent member which also has a convex cylindrical surface portion 40 whose axis U—U is parallel to the plane of the planar surface 36.

Each needle cage 34 has two parallel and opposed longitudinal side walls 43 and 44 which are respectively cooperative with opposed and parallel side surfaces 46 and 48 of the track 38 associated with the cage 34.

The side walls 46 and 48 are perpendicular to the plane of a planar surface portion 36 and each needle cage 34 is thus retained in the radial direction relative to the track 38 and is longitudinally guided in a direction parallel to the plane of the planar surface 36 and to the axis U—U of the convex cylindrical surface portion 40.

The convex cylindrical surface portion 40 of each track 38 is cooperative with a complementary concave cylindrical surface portion 42 provided in the transmission joint body 12.

The transmission joint body 12 includes for this purpose three series of pairs of axial grooves 42 which have a partly circular cross-sectional shape.

The design of the joint body 12 is therefore particularly simple and may be very cheaply manufactured on an industrial scale, for example by forging and sizing.

As can be seen in FIG. 2, the tracks 38 are axially immobilized relative to the transmission joint body 12 by a portion 50 of a member 52 formed over or crimped onto the joint body 12 and consequently they can only move relative to the joint body in pivoting about an axis which substantially corresponds to the axis U—U common to the concave cylindrical surface portions 42 and convex cylindrical surface portions 40.

Owing to the design of the transmission joint just described, the torque transmitting loads are always centred relative to the groups of rolling elements.

There is no radial sliding phenomenon induced when the transmission joint operates at an angle and the rolling elements, for example in the form of needles 32, are subjected to no radial sliding phenomenon.

The needle cages 34 may be guided and retained by any means equivalent to the side walls 43 and 44 and, for example, by a single side wall which would be received in a longitudinal guiding and retaining groove formed in the planar surface portion 36 of the track 38 associated with the needle cage 34.

The transmission joint body may also be made from a synthetic composite material in accordance with the teaching of the document FR-A-2,663,699.

What is claimed is:

1. Articulated transmission joint of the slidable type comprising in combination: a transmission joint body, a tripod element having three radial arms evenly spaced apart about an axis of rotation of said tripod element, a spherical trunnion formed on each of said arms, two articulation elements pivotally mounted on and disposed on opposite sides of each of said spherical trunnions, each of said articulation elements defining a planar surface, three bearing ways in combination with said joint body and each comprising two track members, each track member defining a planar surface portion and a convex cylindrical surface portion which has an axis parallel to said planar surface portion of said track member, six concave cylindrical bearing surfaces on said joint body, each of said convex surface portions of said track members being complementary with and pivotally mounted in a respective one of said concave cylindrical bearing surfaces on said joint body, the two concave bearing surfaces pertaining to each of said bearing ways having axes which are parallel to each other, and said planar surface portion of each of said track members being cooperative with said planar surface of a respective one of said articulation elements which are interposed between the respective spherical trunnions and track members.

2. Transmission joint according to claim 1, wherein said axes of said six concave cylindrical bearing surfaces are parallel to one another.

3. Transmission joint according to claim 1, comprising a series of rolling elements and a cage for retaining said rolling elements interposed between each planar surface of an articulation element and said planar surface portion of the respective track member.

4. Transmission joint according to claim 3, wherein said rolling elements are needles.

5. Transmission joint according to claim 4, wherein each of said cages of said needles comprises at least one longitudinal guiding and retaining side wall which extends in a direction perpendicular to axes of rotation of said needles and is cooperative with at least one complementary guide surface which is on the respective track member and is parallel to said axis of said convex surface portion of said track member.

6. Transmission joint according to claim 5, wherein each cage comprises two parallel guiding and retaining side walls between which are received two cooperative opposed and parallel guide surfaces on the respective track member.

7. Transmission joint according to claim 1, wherein each track member is axially immobilized relative to said joint body.

* * * * *